(12) United States Patent
Smith

(10) Patent No.: US 8,795,625 B2
(45) Date of Patent: Aug. 5, 2014

(54) SULFUR RECOVERY PROCESS

(71) Applicant: Strom W. Smith, Gulfport, MS (US)

(72) Inventor: Strom W. Smith, Gulfport, MS (US)

( * ) Notice: Subject to any disclaimer, the term of this patent is extended or adjusted under 35 U.S.C. 154(b) by 0 days.

(21) Appl. No.: 14/039,676

(22) Filed: Sep. 27, 2013

(65) Prior Publication Data

US 2014/0086812 A1 Mar. 27, 2014

Related U.S. Application Data

(60) Provisional application No. 61/706,594, filed on Sep. 27, 2012.

(51) Int. Cl.
*C01B 17/04* (2006.01)
*G05D 7/00* (2006.01)
*B01D 53/52* (2006.01)

(52) U.S. Cl.
CPC ............... *B01D 53/52* (2013.01); *Y10S 423/05* (2013.01)
USPC .................. 423/574.1; 423/DIG. 5; 422/105; 422/108; 422/111

(58) Field of Classification Search
USPC ........... 423/574.1, DIG. 5; 422/105, 108, 111
See application file for complete search history.

(56) References Cited

U.S. PATENT DOCUMENTS 3,851,050 A * 11/1974 Groenendaal et al. ..... 423/574.1
7,250,149 B1 * 7/2007 Smith ......................... 423/573.1

FOREIGN PATENT DOCUMENTS

JP 56-44844 A * 4/1981 ................. 423/574.1

* cited by examiner

*Primary Examiner* — Timothy Vanoy
(74) *Attorney, Agent, or Firm* — Keeling Patents & Trademarks, LLC; Kenneth A. Keeling; Melissa M. Martinez

(57) ABSTRACT

A process for removing sulfur compounds, particularly hydrogen sulfide, from a waste gas wherein sulfur dioxide is introduced into the process gas at multiple process locations. Quantities of sulfur dioxide are introduced into the process gas stream at one or more locations preceding catalytic reaction. The process of the present invention may be practiced for Claus processes involving initial thermal reactions, and may be practiced without necessity of preliminary thermal reaction. In an embodiment of the invention, one of the injection locations of sulfur dioxide is the thermal reactor.

19 Claims, 4 Drawing Sheets

SULFUR RECOVERY PROCESS

CROSS-REFERENCE TO RELATED APPLICATIONS

This application claims the benefit of U.S. Provisional Patent Application No. 61/706,594 titled "Sulfur Recovery Process" filed in the United States Patent and Trademark Office on Sep. 27, 2012.

STATEMENT REGARDING FEDERALLY SPONSORED RESEARCH OR DEVELOPMENT

Not Applicable.

BACKGROUND OF THE INVENTION

1. Field of the Invention

The present invention relates generally to processes for sulfur recovery and more specifically to processes for removing sulfur compounds, including hydrogen sulfide and sulfur dioxide, from refinery and like waste gas streams.

2. Description of the Related Art

Processing of hydrocarbon-containing fuels such as gasoline and diesel fuel results in gases containing sulfur compounds, including hydrogen sulfide ($H_2S$), and hydrocarbon compounds, referred to herein from time to time as waste gas or offgas streams. Governmental regulations limit plant emissions of sulfur-bearing gases. Refineries commonly include sulfur reduction units to decrease emissions of sulfur compounds.

The use of a Claus catalytic reaction is widely known in the field and commonly used in sulfur recovery units. The currently practiced modified Claus process consists of a thermal stage and a catalytic stage. In the thermal stage, a waste gas containing hydrogen sulfide is injected into a thermal reactor where hydrogen sulfide is partially oxidized with air at high temperatures to form a quantity of sulfur dioxide. The thermal reaction further serves to oxidize ammonia. Combustion gases are cooled in a waste heat boiler in which a portion of the hydrogen sulfide reacts with sulfur dioxide to form water and elemental sulfur. The elemental sulfur is condensed and removed.

In the Clause process catalytic stage, remaining gases are transmitted to a series of reactors to further react hydrogen sulfide and sulfur dioxide to remove elemental sulfur. Typically the reactors utilize a catalyst, such as aluminum oxide, titanium oxide or bauxite. Typical Claus process catalytic stages include heating the process gas, reaction in the catalytic reactor, condensation of the elemental sulfur, and further transmission of the remaining process gases. One to four reactor stages are typically practiced; however, a typical process involves two or three reactors. Tail gas treatment processes further treat remaining process gas after the last reactor.

The Claus process involves reaction of sulfur dioxide ($SO_2$) and hydrogen sulfide ($H_2S$) react to produce elemental sulfur ($S_2$) and steam/water ($H_2O$). The reaction formula is:

$$2H_2S + SO_2 \rightarrow 1.5S_2 + 2H_2O$$

Stoichiometric balance of two moles of hydrogen sulfide to one mole of sulfur dioxide in the process is historically difficult to achieve due to, among other things, variations in composition of off-gas streams.

The present invention provides a process to obtain stoichiometric balance by introducing determined flow quantities of sulfur dioxide into the process stream at determined locations during a multiple stage reactor process, analyzing hydrogen sulfide content at one or more locations, and adjusting input flows of sulfur dioxide into the process stream at one or more locations. Advantages of the present invention include reduced total mass flow during the process and consequently reduce pressure drop, thereby providing improved process efficiency and increased capacity of existing Claus process facilities. In an embodiment of the present invention wherein sulfur dioxide is introduced into the thermal reactor, the injected sulfur dioxide reduces combustion air required in the thermal reactor, thereby reducing mass flow of, among other things, water and nitrogen, and correspondingly reduces pressure drop and increases efficiency of a given sulfur recovery unit.

BRIEF SUMMARY OF THE INVENTION

The present invention comprises an improvement to a Claus process for removing sulfur compounds, particularly hydrogen sulfide, from a waste gas wherein sulfur dioxide is introduced into the process gas at multiple process locations. In particular, quantities of sulfur dioxide are introduced into the process gas stream at one or more locations preceding catalytic reaction. The process of the present invention may be practiced for Claus processes involving initial thermal reactions, and may be practiced without necessity of preliminary thermal reaction. In an embodiment of the invention, one of the injection locations of sulfur dioxide is the thermal reactor.

DESCRIPTION OF THE INVENTION

Figure 1:
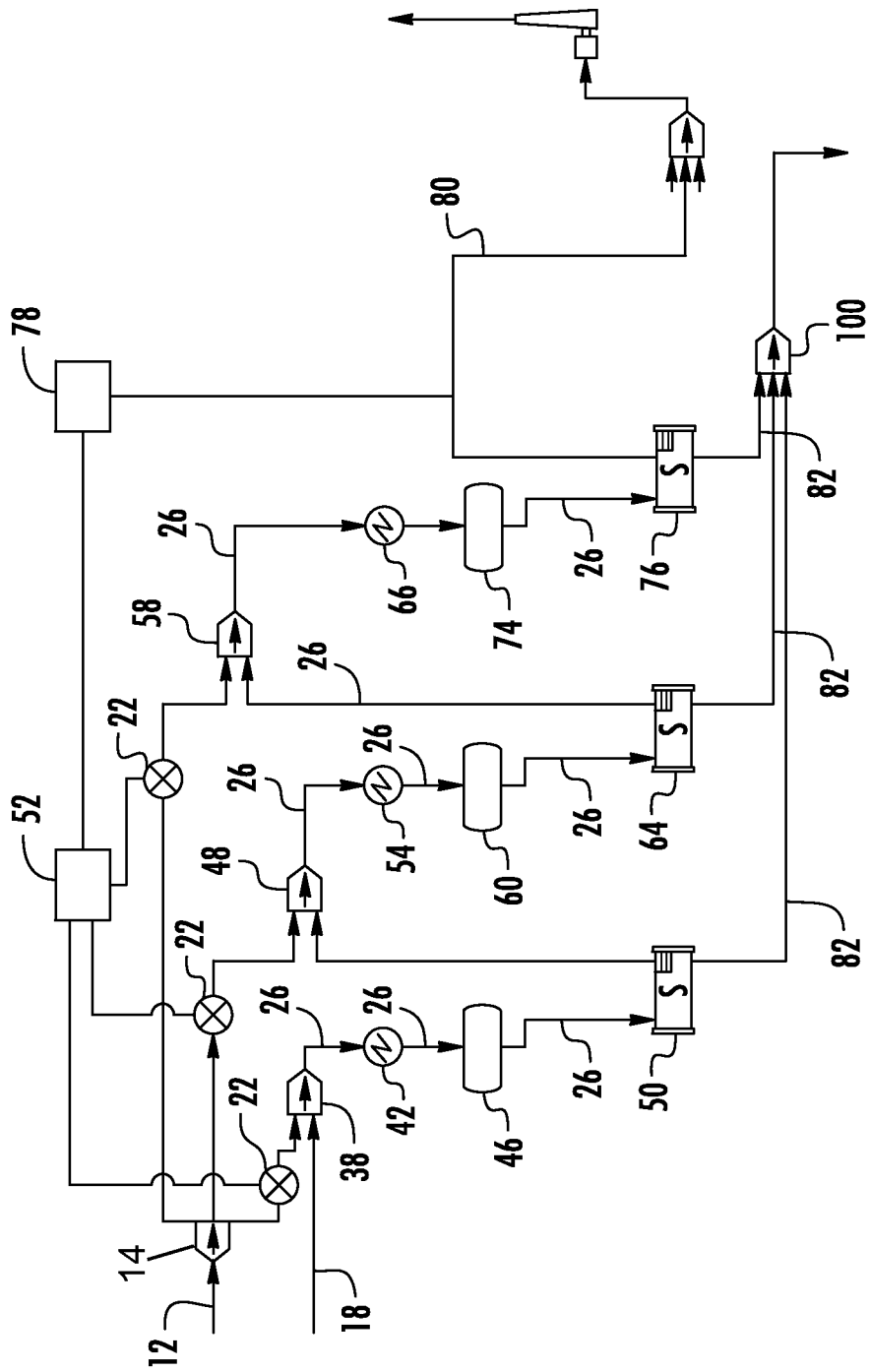
FIG. 1 is a diagram of the process of the present invention.

Referring to FIG. 1, the preferred embodiment of the waste treatment process 10 of the present invention is depicted. Waste treatment process 10 of the present invention includes mixers 38, 48, 58, heat exchangers 42, 54, 66, reactors 46, 60, 74, condensers 50, 64, 76, sulfur dioxide splitter 14, analyzer 78 and controller 52 collectively operable to provide controlled quantities of sulfur dioxide in relation to hydrogen sulfide contained in a waste gas stream containing hydrogen sulfide. Sulfur dioxide is introduced into the stream at multiple locations.

Referring to FIG. 1, hydrogen sulfide and other compounds comprise waste gas from a refinery or other industrial process and are contained in a waste gas line 18. Waste gas line 18 typically contains various quantities of hydrogen sulfide, water, oxygen, nitrogen, carbon dioxide, sulfur dioxide, carbon monoxide and relatively small amounts of other hydrocarbon compounds. Compositions vary depending on the process, variations in the input stream and variations in the application of the process.

A sulfur dioxide line 12 containing sulfur dioxide is provided. A first quantity of sulfur dioxide is injected through sulfur dioxide line 12 into hydrogen sulfide waste line 18 and mixed at mixer 38. The mixture of sulfur dioxide and waste gas containing hydrogen sulfide and sulfur dioxide downstream of mixer 38 is referred to herein as process gas. Process gas may describe various relative mixtures of sulfur dioxide and waste gas as process 10 progresses.

In an exemplary embodiment, sulfur dioxide is provided from a sulfur dioxide generator (not shown) or other source via sulfur dioxide line 12 to a sulfur dioxide splitter 14. Splitter 14 is operable to allow flow of sulfur dioxide in various quantities therefrom. In an exemplary embodiment, splitter is a manifold connected to multiple output lines.

Flow quantity of sulfur dioxide delivered to mixer 38 may be adjusted by controller 52 in accordance with predetermined parameters or through operator input. Control of flow to mixer 38 may be accomplished by valves 22 or by valves (not shown) incorporated in mixer 38.

In an exemplary embodiment the ideal amount of the first quantity of sulfur dioxide is an amount needed to provide a stoichiometric mix of sulfur dioxide and hydrogen sulfide, namely 2 moles of hydrogen sulfide to 1 mole of sulfur dioxide, to accomplish a Claus reaction, namely:

$$2H_2S+SO_2 \rightarrow 1.5S_2+2H_2O$$

Process gas is subsequently transmitted through process gas line 26 to heat exchanger 42 where the process gas is heated (if required) to a temperature at a determined level above dew point of sulfur vapor. As the dew point of sulfur is typically in a range of 120-150° C. (248-302° F.), the required temperature is typically a determined level above 150° C. (302° F.). Heating process gas to a determined level above the dew point of sulfur is known and commercially practiced. In the event waste gas contained in waste gas line 18 is at sufficient temperature to provide a process gas temperature at or above the determined temperature, heating of process gas at heat exchanger 42 is not required.

Process gas is then transmitted by line 26 to a first reactor 46 where a catalyst, such as aluminum oxide, titanium oxide or bauxite, is utilized to catalyze reaction of hydrogen sulfide and sulfur dioxide in the process gas to produce elemental sulfur and water. Reactor 46 is a conventional, commercially practiced Claus catalytic reactor.

Process gas is then transmitted by line 26 to a first condenser 50. Elemental sulfur is condensed in first condenser 50. Condensed sulfur is transmitted through line 82 to outlet container 100.

Process gas remaining after condensation of sulfur from condenser 50 is transmitted through process line 26 to second mixer 48. A second quantity of sulfur dioxide is transmitted from splitter 14 through sulfur dioxide line 12 and injected into process gas line 26 at second mixer 48. Sulfur dioxide flow is controlled by controller 52 in combination with valve 22. In an exemplary embodiment the ideal amount of the second quantity of sulfur dioxide is an amount needed to provide a stoichiometric mix of sulfur dioxide and hydrogen sulfide, namely 2 moles of hydrogen sulfide to 1 mole of sulfur dioxide, to accomplish a Claus reaction. Due to waste gas mix variations and flow variations, precise amounts are not readily determinable by calculation.

Process gas is then transmitted by line 26 to second heat exchanger 54 and heated to a temperature to a determined level above the dew point of sulfur. Process gas is then transmitted by line 26 to a second Claus reactor 60 where a catalyst, such as aluminum oxide, titanium oxide, or bauxite, is utilized to catalyze reaction of hydrogen sulfide and sulfur dioxide in the process gas.

Process gas is then transmitted by line 26 to second condenser 64. Elemental sulfur is condensed in second condenser 64. Condensed sulfur is transmitted through line 82 to outlet container 100.

Process gas remaining after sulfur condensation in condenser 64 is transmitted through process line 26 to third mixer 58. If needed, a third quantity of sulfur dioxide is transmitted from splitter 14 through sulfur dioxide line 12 and injected into process gas line 26 downstream of second condenser 64 at second mixer 48. Controller 52 in combination with valve 22 or other control mechanism inputs a determined amount, if any, of sulfur dioxide.

Process gas is then transmitted by line 26 through third heat exchanger 66 and third Claus reactor 74. Sulfur dioxide flow is controlled by controller 52 in combination with valve 22. In an exemplary embodiment the amount of the second quantity of sulfur dioxide is an amount required to provide transmitted to provide a stoichiometric mix of sulfur dioxide and hydrogen sulfide, namely 2 moles hydrogen sulfide to 1 mole of sulfur dioxide, to accomplish a Claus reaction.

Process gas is then transmitted by line 26 to third heat exchanger 66 and heated to a temperature in a determined level above the dew point of sulfur. Process gas is then transmitted by line 26 to a third Claus reactor 74 where a catalyst, such as aluminum oxide, titanium oxide or bauxite, is utilized to catalyze reaction of hydrogen sulfide and sulfur dioxide in the process gas to produce elemental sulfur and water.

Process gas is then transmitted by line 26 to third condenser 76. Elemental sulfur is condensed in third condenser 76. Condensed sulfur is transmitted through line 82 to outlet container 100.

Remaining process gas that has not been condensed, referred to as tail gas, is transmitted through tail gas line 80 for further processing.

As indicated hereinabove, controller 52 adjusts flow of sulfur dioxide delivered from sulfur dioxide splitter 14 to mixer 38, second mixer 48 and third mixer 58. Control devices such as controller 52 are known in the art and may incorporate various processors, input sources and output as needed to receive and analyze process analyzer data, store data, provide control commands and provide output, including output displays as are known in the art.

Analyzer 78 is utilized to determine the quantities of hydrogen sulfide and sulfur dioxide in tail gas line 80. Analyzer 78 is electronically connected to controller 52. Measured quantities of sulfur dioxide and hydrogen sulfide are communicated to controller 52. Controller 52 is then operated to control flow of sulfur dioxide to mixer 38 mixer 38, second mixer 48 and third mixer 58 pursuant to parameters previously input to controller 52 or as determined by an operator.

As the process 10 of the present invention comprises a continuous operation, flow rates of sulfur dioxide to mixer 38, second mixer 48 and third mixer 58 may be continually adjusted to provide optimum process operation responsive to controller 52. Upon stabilized flow of adjusted volumes of sulfur dioxide further analysis and flow adjustment of sulfur dioxide may be made to achieve optimum levels of hydrogen sulfide in tail gas transmitted by tail gas line 80.

Figure 2:
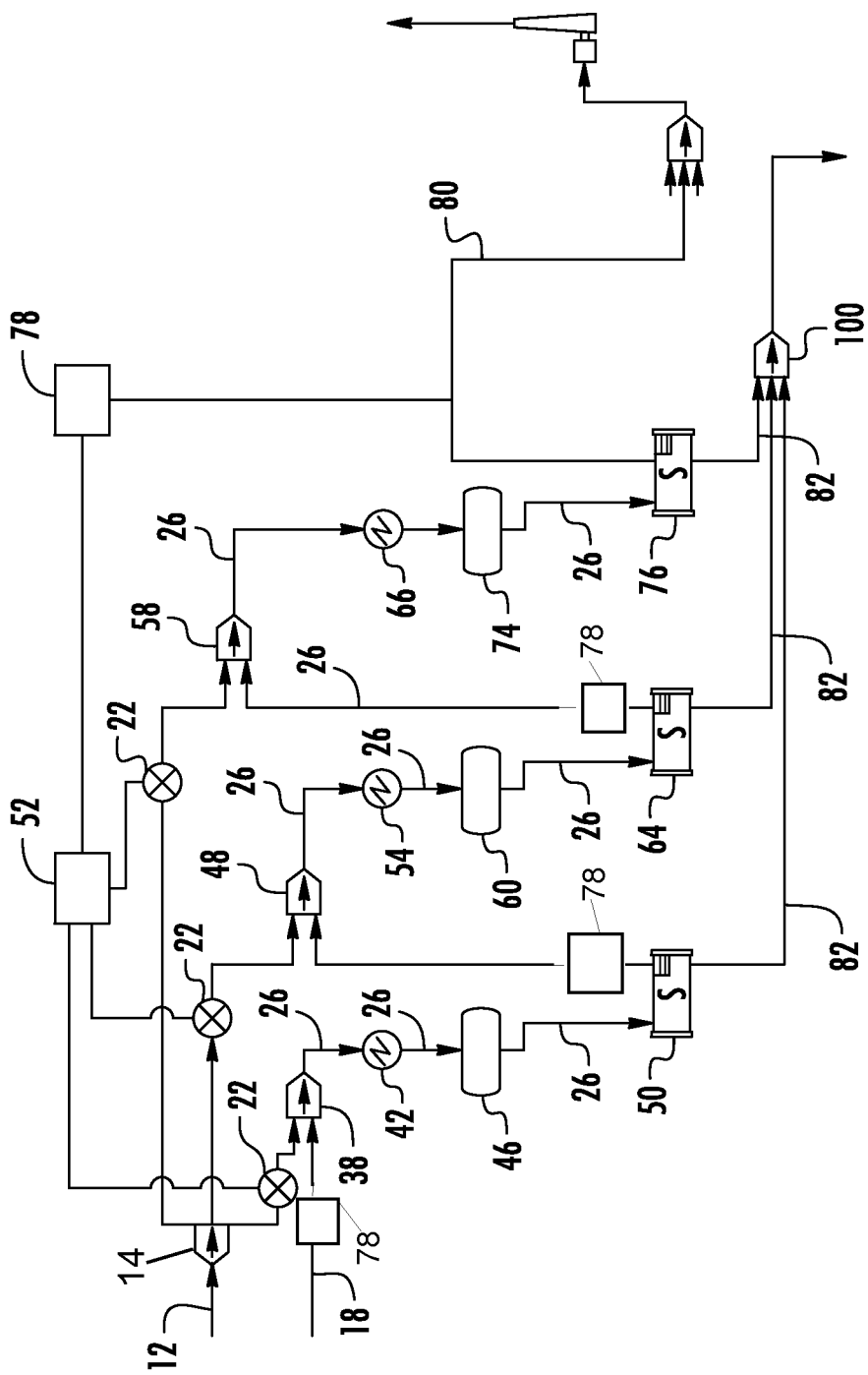
FIG. 2 is a diagram of an alternative embodiment of the process of the present invention.

In an alternative embodiment depicted in FIG. 2, analyzers 78 are provided to determine hydrogen sulfide and sulfur dioxide quantities in process line 26 at other locations. Each analyzer is electronically connected to controller 52 (electronic connections are depicted by lines on FIG. 2) to transmit measurements obtained. An analyzer 78 is provided at waste gas line 18 upstream of mixer 38 to determine quantities of hydrogen sulfide and sulfur dioxide in waste gas. Such determination allows determination of flow rate of sulfur dioxide to mixer 38 to achieve desired balance of sulfur dioxide to hydrogen sulfide at mixer 38. An analyzer 78 is provided downstream of sulfur condenser 50 and upstream of mixer 48 to determine hydrogen sulfide and sulfur dioxide in process line 26 upstream of mixer 48. Such placement allows determination of flow rate of sulfur dioxide to mixer 48 to achieve desired stoichiometric balance of sulfur dioxide to hydrogen sulfide at mixer 48. An analyzer 78 is provided downstream of sulfur condenser 64 and upstream of mixer 58 to allow measurement of hydrogen sulfide and sulfur dioxide in process line 26 upstream of mixer 58 and allow determination of flow rate of sulfur dioxide to mixer 58 to achieve desired stoichiometric balance of sulfur dioxide to hydrogen sulfide at mixer 58. Accordingly, the alternative embodiment of FIG. 2 allows control of fluid flow to allow controlled mixing of hydrogen sulfide and sulfur dioxide for a Claus reaction at multiple locations based on determined quantities of hydrogen sulfide and sulfur dioxide in the process gas as analyzed at multiple locations.

In a third exemplary embodiment, an analyzer 78 is used to analyze hydrogen sulfide content of tail gas 80 and at least one other analyzer 78 is provided at one or more, but not all locations described in second exemplary embodiments thereby allowing selective determination of content of sulfur dioxide and hydrogen sulfide in the waste gas or process gas and adjustment of sulfur dioxide flow responsive thereto. In such embodiment, while precise hydrogen sulfide content of process gas and sulfur dioxide is not known upstream of all mixers, the multiple data points provide information useful to determine desired flow rate of sulfur dioxide to mixer 38, mixer 48 and mixer 58 to obtain optimal hydrogen sulfide elimination by process 10.

A fourth exemplary embodiment of the present invention comprises addition of a fourth mixer, heat exchanger, reactor and condenser to provide a fourth stage of Claus reaction. This embodiment is not depicted as it is repetitive of the second and third stages described herein.

A fifth exemplary embodiment of the present invention comprises deletion of a Claus reaction stage, thereby defining a two-stage process. In such embodiment, mixer 48, heat exchanger 54, reactor 60 and condenser 64 would not be included in the process.

In all exemplary embodiments wherein reference to stoichiometric balances of sulfur dioxide with hydrogen sulfide are referenced, it is noted that balances and flow rates other than exact stoichiometric quantities may be desirable at specific mixers 38, 48, and 58 and that other than exact stoichiometric quantities may be required for operational reasons. Accordingly, the teachings of the process 10 are not limited to stoichiometric quantities.

Figure 3:
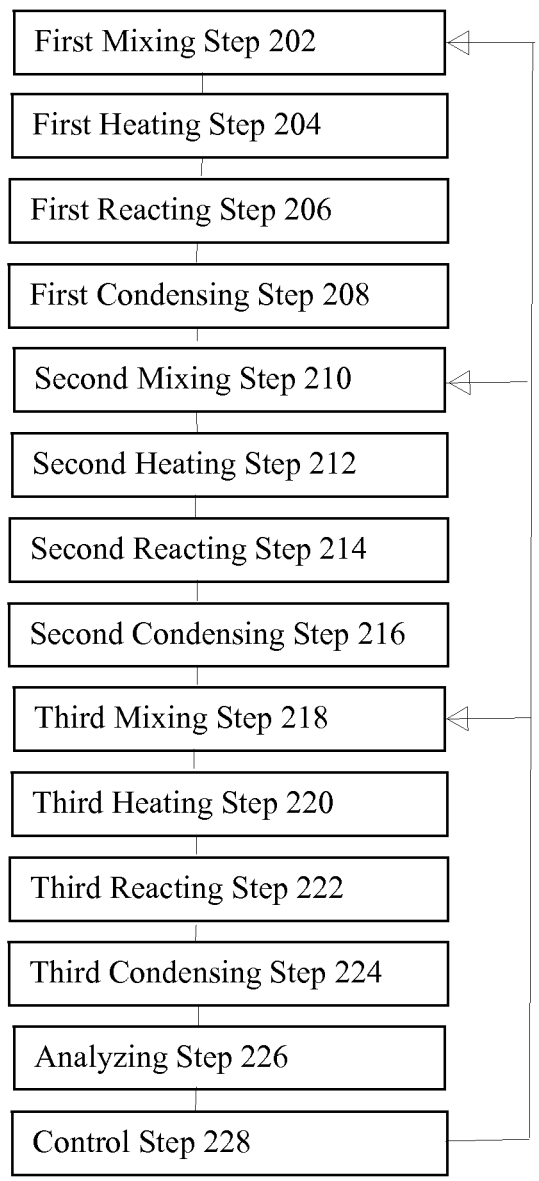
FIG. 3 is a diagram of the steps of the process of the present invention.

Referring to FIG. 3, a method 200 of the present embodiment comprises:

A first mixing step 202 of mixing a sulfur dioxide stream with an waste stream, said waste stream containing hydrogen sulfide, the mixed stream referred to herein as a process stream;

A first heating step 204 of heating the process stream to a determined temperature.

A first reacting step 206 of reacting said hydrogen sulfide with said sulfur dioxide in the presence of a catalyst;

A first condensing step 208 of condensing sulfur from said process stream;

A second mixing step 210 of mixing a sulfur dioxide stream with said process stream;

A second heating step 212 of heating said process stream to a determined temperature.

A second reacting step 214 of reacting said hydrogen sulfide with said sulfur dioxide in the presence of a catalyst;

A second condensing step 216 of condensing sulfur from said process stream;

A third mixing step 218 of mixing a sulfur dioxide stream with said process stream;

A third heating step 220 of heating said process stream to a determined temperature.

A third reacting step 222 of reacting said hydrogen sulfide with said sulfur dioxide in the presence of a catalyst;

A third condensing step 224 of condensing sulfur from said process stream;

An analyzing step 226 of analyzing the amount of hydrogen sulfide in said process stream after said third condensing step; and A control step 228 of adjusting flow of sulfur dioxide to the process stream at any of said first mixing step 202, said second mixing step 210, and said third mixing step 218.

In an application wherein the temperature of said process gas exceeds the dew point of sulfur vapor downstream of said first mixing step 202, first heating step 204 may be omitted.

In an alternative embodiment of the method, analyzing step 226 further comprises a step of analyzing the amount of hydrogen sulfide and sulfur dioxide in said waste gas prior to said first mixing step and in said tail gas.

In an alternative embodiment of the method analyzing step 226 comprises a step of analyzing the amount of hydrogen sulfide and sulfur dioxide in said waste gas prior to said first mixing step, in said tail gas and in said process gas prior to said second mixing step.

In an alternative embodiment of the method analyzing step 226 comprises a step of analyzing the amount of hydrogen sulfide and sulfur dioxide in said waste gas prior to said first mixing step, in said tail gas, in said process gas prior to said second mixing step, and in said process gas prior to said third mixing step.

Exemplary Simulation

In an exemplary simulation utilizing commercially practiced simulation methods and software developed for and used in the industry, a simulation produced the following exemplary process with calculated results. Quantities herein are generally rounded to whole numbers.

A first quantity of sulfur dioxide is injected by sulfur dioxide line 12 into hydrogen sulfide waste line 18 at mixer 38. In the simulation, 39.5 kilogram moles (87 pound moles) per hour of sulfur dioxide are transmitted from splitter 14 to mixer 38. At mixer 38, the sulfur dioxide is mixed with a waste gas mixture containing, among other things, 132 kilogram moles (291 pound moles) per hour of hydrogen sulfide.

Process gas is heated at heat exchanger 42 to 448° C. (839° F.). Process gas is then transmitted by line 26 to a first Claus reactor 46 where an aluminum oxide based catalyst is utilized to catalyze reaction of hydrogen sulfide and sulfur dioxide. Process gas is transmitted to condenser 50 wherein sulfur is condensed at a temperature of approximately 177° C. (350° F.). Elemental sulfur is condensed at condenser 50 with 15 kilogram moles (33 pound moles) per hour of elemental sulfur transmitted to outlet container 100.

Process gas from condenser 50 is transmitted to mixer 48 containing, among other things, 55.8 kilogram moles (123 pound moles) per hour of hydrogen sulfide and 1.4 kilogram moles (3 pound moles) per hour sulfur dioxide. From splitter 14, 26.3 kilogram moles (58 pound moles) per hour of sulfur dioxide are transmitted to mixer 48. Mixed process gas is then transmitted by line 26 to second heat exchanger 54 and then to second Claus reactor 60 at a reactor temperature of 193° C. (380° F.) to reactor 60. At second reactor 60, aluminum oxide is utilized to catalyze reaction of hydrogen sulfide and sulfur dioxide. Process gas is then transmitted from reactor 60 to second condenser 64. At second condenser 64, 10.9 kilogram moles (24 pound moles) per hour of elemental sulfur is condensed at a temperature of 135° C. (275° F.) and transmitted to outlet container 100.

Process gas from condenser containing, among other things, 0.54 kilogram moles (1.2 pound moles) per hour of hydrogen sulfide, 0.28 kilogram moles (0.61 pound moles) per hour sulfur dioxide and 8.6 kilogram moles (19 pound moles) per hour of sulfur is 64 is transmitted to mixer 58. No sulfur dioxide is transmitted from splitter 12 to mixer 58. (Note that sulfur dioxide transmission from splitter 14 to mixer 58 may be done if needed to obtain needed molar balance). Process gas is then transmitted by line 26 to third heat exchanger 66 and then to third Claus reactor 74 at a reactor temperature of 135° C. (275° F.) at third reactor 74. At third reactor 74, aluminum oxide is utilized to catalyze reaction of hydrogen sulfide and sulfur dioxide. Process gas is transmitted from reactor 74 to third condenser 76. At third condenser 76, 0.4 kilogram moles (8 pound moles) per hour of elemental sulfur are condensed and transmitted to outlet container 100. Process gas containing, among other things, 2.9 kilogram moles (6.5 pound moles) per hour of sulfur and 0.2 kilogram moles (0.5 pound moles) per hour of hydrogen sulfide, is transmitted by tail gas line 80 from condenser 76 to mixer 103.

Tail gas is transmitted from third mixer 103 to incinerator 106. While tail gas may be further processed if desired, the simulation indicates incineration.

In the simulation an input flow of 132 kilogram moles (291 pound moles) per hour of hydrogen sulfide is treated to accomplish an outflow of 0.2 kilogram moles (0.5 pound moles) per hour of hydrogen sulfide under the process of the present invention.

Figure 4:
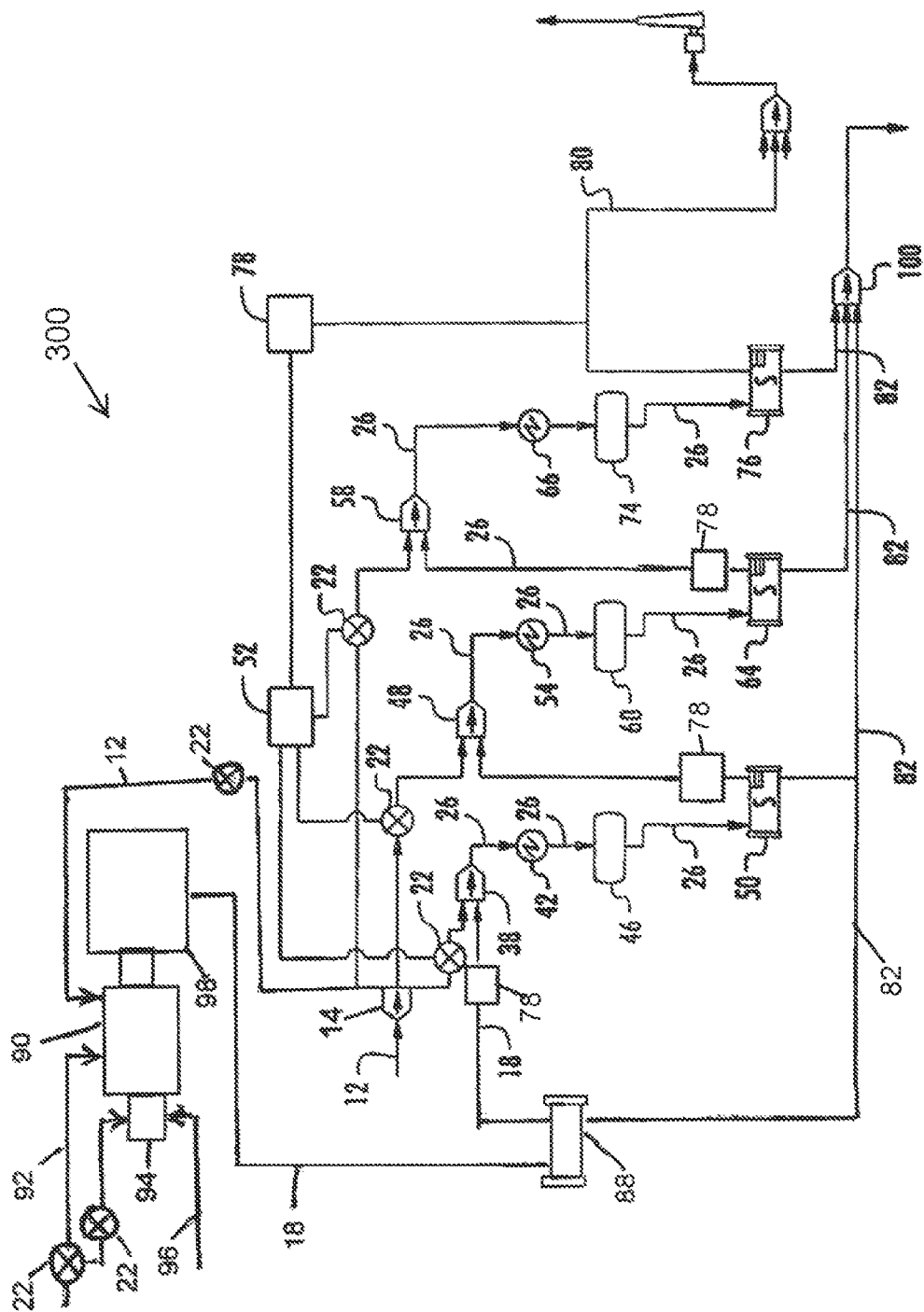
FIG. 4 is a diagram of an alternative embodiment of the process of the present invention.

Referring to FIG. 4, a process 300 of an alternative embodiment of the present invention comprises injection of sulfur dioxide into thermal reactor 90. In the embodiment of FIG. 4, a waste gas is introduced into reactor 90 by line 92. A flow of waste gas is directed through line 86 to the burner chamber 94 where it is combusted with air. Air is injected into burner chamber 94 by air line 96. The combusted waste gas flows from burner chamber 94 to thermal reactor 90. A second flow of waste gas is injected into thermal reactor 90 by waste gas line 92. Within chamber 94 and thermal reactor 90, among other things, hydrogen sulfide reacts with air to produce sulfur dioxide, water and nitrogen, and sulfur dioxide reacts with hydrogen sulfide to produce elemental sulfur and water.

In the embodiment of FIG. 4, sulfur dioxide is introduced into thermal reactor 90 by way of sulfur dioxide line 12. Sulfur dioxide is introduced into thermal reactor 90 to provide a quantity of sulfur dioxide for reaction with hydrogen sulfide existing in the waste gas and thereby reduce required quantity of combustion air. Reduced combustion air in the thermal reactor results in less mass of both nitrogen and water in the waste gas and process gas and decreases pressure drop during the sulfur removal process 10.

From reactor 90 waste gas is transmitted to waste gas boiler 98 for cooling of the waste gas and heat recovery. The heat recovery process is not depicted as waste heat recovery is commonly practiced and known in the industry. Waste gas is then transmitted by waste gas line to condenser 88. Elemental sulfur is condensed from waste gas at condenser 88. Waste gas is then transmitted through waste gas line 18 to mixer 38 for processing according to the embodiments previously described herein.

Controller 52 and valves 22 are operable to control flow of waste gas through lines 92 and 86, of air through line 96 and of sulfur dioxide through line 12. Flow rates of waste gas through lines 92 to reactor 90, of waste gas through line 86 to burner chamber 94, of air through line 96 and of sulfur dioxide through line 12 may be determined by predetermined parameters. As indicated in previously-described embodiments, controller 52 may comprise a single controller or multiple controllers. As indicated in previously-described embodiments, multiple analyzers may be used. The process 300 of FIG. 4 is practiced after condenser 88 as described in previously-described embodiments.

While the preferred embodiments of the invention have been described and illustrated, modifications thereof can be made by one skilled in the art without departing from the teachings of the invention. Descriptions of embodiments are exemplary and not limiting. The extent and scope of the invention is set forth in the appended claims and is intended to extend to equivalents thereof. The claims are incorporated into the specification. Disclosure of existing patents, publications and known art are incorporated herein to the extent required to provide reference details and understanding of the disclosure herein set forth.

I claim:

1. A process for removing hydrogen sulfide from a waste stream comprising:
   a first mixing step of mixing a sulfur dioxide stream with said waste stream to create a process stream, said process stream containing sulfur dioxide and hydrogen sulfide;
   a first reacting step of reacting said hydrogen sulfide with said sulfur dioxide in the presence of a catalyst;
   a first condensing step of condensing sulfur from said process stream;
   at least one subsequent mixing step of mixing at least one subsequent sulfur dioxide stream with said process stream;
   at least one subsequent reacting step of reacting said hydrogen sulfide with said sulfur dioxide in the presence of a catalyst;
   at least one subsequent condensing step of condensing sulfur from said process stream;
   an analyzing step of analyzing the amount of hydrogen sulfide and sulfur dioxide in said process stream; and
   a control step of adjusting flow of sulfur dioxide in at least one of said first mixing step and said at said at least one subsequent mixing step.

2. A process according to claim 1 further comprising:
   a first heating step prior to said first reacting step of heating said process stream as required to maintain said process stream at a determined temperature in excess of the dew point of sulfur; and
   at least one subsequent heating step prior to each said at least one reacting step of heating said process stream as required to maintain said process stream at a determined temperature in excess of the dew point of sulfur.

3. A process according to claim 1 further comprising:
   Said analyzing step comprising analyzing hydrogen sulfide and sulfur dioxide content in said process stream after the last said at least one subsequent condensing step.

4. A process according to claim 1 further comprising:
   said analyzing step comprising analyzing hydrogen sulfide and sulfur dioxide content in said process stream at multiple locations.

5. A process according to claim 4 further comprising:
   said analyzing step comprising analyzing hydrogen sulfide and sulfur dioxide content in said process stream after the last said at least one condensing step and analyzing hydrogen sulfide and sulfur dioxide content in said process stream in at least one other location of said process.

6. A process according to claim 4 further comprising:
said analyzing step comprising analyzing hydrogen sulfide and sulfur dioxide content in said process stream after said first condensing step and after each said at least one subsequent condensing steps.

7. A process according to claim 1 further comprising:
said control step comprising adjusting flow of sulfur dioxide in at least two of said first mixing step and said at least one subsequent mixing step.

8. A process according to claim 4 further comprising:
said control step comprising adjusting flow of sulfur dioxide to said process stream at multiple locations.

9. A process for removing hydrogen sulfide from a waste stream comprising:
a thermal step of combusting at least a portion of said waste stream with air in a thermal reactor;
a first mixing step of mixing a sulfur dioxide stream with said waste stream in said thermal reactor to create a process stream, said process stream containing sulfur dioxide and hydrogen sulfide;
a first condensing step of condensing sulfur from said process stream;
at least one subsequent mixing step of mixing at least one subsequent sulfur dioxide stream with said process stream;
at least one subsequent reacting step of reacting said hydrogen sulfide with said sulfur dioxide in the presence of a catalyst;
at least one subsequent condensing step of condensing sulfur from said process stream;
an analyzing step of analyzing the amount of hydrogen sulfide and sulfur dioxide in said process stream; and
a control step of adjusting flow of sulfur dioxide in at least one of said first mixing step and said at said at least one subsequent mixing step.

10. A process according to claim 9 further comprising:
a heating step prior to each said at least one subsequent reacting step as required to maintain said process stream at a determined temperature in excess of the dew point of sulfur.

11. A process according to claim 9 further comprising:
said analyzing step comprising analyzing hydrogen sulfide and sulfur dioxide content in said process stream after the last said at least one subsequent condensing step.

12. A process according to claim 9 further comprising:
said analyzing step comprising analyzing hydrogen sulfide and sulfur dioxide content in said process stream at multiple locations.

13. A process according to claim 9 further comprising:
said analyzing step comprising analyzing hydrogen sulfide and sulfur dioxide content in said process stream after the last said at least one subsequent condensing step and analyzing hydrogen sulfide and sulfur dioxide content in said process stream in at least one other location of said process.

14. A process according to claim 9 further comprising:
said analyzing step comprising analyzing hydrogen sulfide and sulfur dioxide content in said process stream after the last said at least one subsequent condensing step, analyzing hydrogen sulfide and sulfur dioxide content in said process stream intermediate said thermal reactor and said first subsequent mixing step, and analyzing hydrogen sulfide and sulfur dioxide content in said process stream in at least one other location of said process.

15. A process according to claim 9 further comprising:
said control step comprising adjusting flow of sulfur dioxide in at least two of said first mixing step and said at least one subsequent mixing step.

16. A process according to claim 12 further comprising:
said control step comprising adjusting flow of sulfur dioxide to said process stream at multiple locations.

17. A process for removing hydrogen sulfide from a waste stream comprising:
a first mixing step of mixing a sulfur dioxide stream with said waste stream to create a process stream, said process stream containing sulfur dioxide and hydrogen sulfide;
a first heating step of heating said process stream to a determined temperature;
a first reacting step of reacting said hydrogen sulfide with said sulfur dioxide in the presence of a catalyst;
a first condensing step of condensing sulfur from said process stream;
a second mixing step of mixing a second sulfur dioxide stream with said process stream;
a second heating step of heating said process stream to a determined temperature;
a second reacting step of reacting said hydrogen sulfide with said sulfur dioxide in the presence of a catalyst;
a second condensing step of condensing sulfur from said process stream;
a third mixing step of mixing a sulfur dioxide stream with said process stream;
a third heating step of heating said process stream to a determined temperature;
a third reacting step of reacting said hydrogen sulfide with said sulfur dioxide in the presence of a catalyst;
a third condensing step of condensing sulfur from said process stream;
an analyzing step of analyzing the amount of hydrogen sulfide in said process stream after said third condensing step; and
a control step of adjusting flow of sulfur dioxide in at least one mixing step.

18. A process according to claim 17 further comprising:
said analyzing step comprising analyzing hydrogen sulfide and sulfur dioxide content in said process stream at multiple locations.

19. A process according to claim 18 further comprising:
said control step comprising adjusting flow of sulfur dioxide to said process stream at multiple locations.

* * * * *

UNITED STATES PATENT AND TRADEMARK OFFICE
CERTIFICATE OF CORRECTION

| | |
|---|---|
| PATENT NO. | : 8,795,625 B2 |
| APPLICATION NO. | : 14/039676 |
| DATED | : August 5, 2014 |
| INVENTOR(S) | : Smith |

Page 1 of 1

It is certified that error appears in the above-identified patent and that said Letters Patent is hereby corrected as shown below:

In the Claims

Column 10, line 6, that portion of claim 14 reading "reactor" should read --step--.

Signed and Sealed this
Twenty-first Day of October, 2014

Michelle K. Lee
*Deputy Director of the United States Patent and Trademark Office*